US012756967B2

(12) United States Patent
Xia

(10) Patent No.: US 12,756,967 B2
(45) Date of Patent: Oct. 6, 2026

(54) HEADPHONE WITH TOUCHSCREEN

(71) Applicant: SHENZHEN JIUHU TECHNOLOGY CO., LIMITED, Shenzhen (CN)

(72) Inventor: Ji Xia, Shenzhen (CN)

(73) Assignee: SHENZHEN JIUHU TECHNOLOGY CO., LIMITED, Shenzhen (CN)

( * ) Notice: Subject to any disclaimer, the term of this patent is extended or adjusted under 35 U.S.C. 154(b) by 123 days.

(21) Appl. No.: 18/991,408

(22) Filed: Dec. 21, 2024

(65) Prior Publication Data

US 2025/0126393 A1 Apr. 17, 2025

(30) Foreign Application Priority Data

Apr. 15, 2024 (CN) ......................... 202420773311.0

(51) Int. Cl.
*H04R 1/10* (2026.01)
*G06F 3/16* (2006.01)
*H04R 1/1025* (2026.01)

(52) U.S. Cl.
CPC ........... *H04R 1/1041* (2013.01); *G06F 3/162* (2013.01); *H04R 1/1025* (2013.01); *H04R 2201/103* (2013.01); *H04R 2420/07* (2013.01)

(58) Field of Classification Search
CPC ................ H04R 1/1041; H04R 1/1025; H04R 2201/103; H04R 2420/07; H04R 1/1008; H04R 5/0335; H04R 2420/09; G06F 3/162
See application file for complete search history.

(56) References Cited

U.S. PATENT DOCUMENTS

| | | | | |
|---|---|---|---|---|
| 2008/0242228 | A1* | 10/2008 | Saito .................... | H04R 1/1091 455/41.2 |
| 2013/0339850 | A1* | 12/2013 | Hardi ........................ | B62D 1/04 715/702 |
| 2016/0295313 | A1* | 10/2016 | Martin ................. | H04R 1/1041 |
| 2018/0132027 | A1* | 5/2018 | Hawkes ................. | A61B 5/123 |
| 2018/0217382 | A1* | 8/2018 | Urbach .............. | G02B 27/0176 |
| 2018/0262606 | A1 | 9/2018 | Leal Mesquita et al. | |
| 2018/0324515 | A1* | 11/2018 | Boesen ................ | H04R 1/1025 |
| 2021/0195309 | A1* | 6/2021 | Filomio, Jr. ............ | G06F 3/162 |
| 2022/0030344 | A1* | 1/2022 | Mamouzette ........... | G06F 3/162 |
| 2022/0058942 | A1* | 2/2022 | Ross ...................... | G08C 17/02 |

* cited by examiner

*Primary Examiner* — Oyesola C Ojo

(57) ABSTRACT

A headphone with a touchscreen, includes a headband, a first headphone body, a second headphone body, and a touch control apparatus, where the first headphone body and the second headphone body are respectively disposed on two ends of the headband, and the touch control apparatus is detachably disposed on the first headphone body; and a first wireless communication element is disposed in the first headphone body, and a second wireless communication element is disposed in the touch control apparatus, and the first wireless communication element is communicatively connected to the second wireless communication element. The touch control apparatus is detachably arranged on the first headphone body, the first wireless communication element is arranged in the first headphone body, and the second wireless communication element is arranged in the touch control apparatus, such that the touch control apparatus can be taken down from the first headphone body, facilitating user operation.

8 Claims, 5 Drawing Sheets

HEADPHONE WITH TOUCHSCREEN

CROSS-REFERENCE TO RELATED APPLICATIONS

This application claims priority to Chinese Patent Application No. 202420773311.0 with a filing date of Apr. 15, 2024. The content of the aforementioned applications, including any intervening amendments thereto, is incorporated herein by reference.

TECHNICAL FIELD

The present disclosure relates to the technical field of headphones, and in particular, relates to a headphone with a touchscreen.

BACKGROUND

With development of society, people have an increasingly high requirement for convenience of life. A headphone may be used for calling, listening to music, playing a game, and the like, and plays an indispensable role in people's daily life. Headphones are mainly classified into over-head headphones and in-ear headphones. During use, the in-ear headphone needs to be well matched with an ear to be well combined with and fixed to the ear. However, due to difference of human bodies and standardization of the in-ear headphone, there is a fixing problem during use of the in-ear headphone, and great harm is caused to an eardrum as a speaker of the in-ear headphone is put into an ear canal. The over-head headphone features high wearing comfort, good sound quality, and a fashionable appearance. In addition, the tightness of the over-head headphone can be adjusted according to a head shape, such that the over-head headphone is worm firmly. Therefore, many people use over-head headphones.

The over-head headphone is something new. As user's expectations on the over-head phone are increasing with user's increasing requirements, currently, some wireless headphones with touchscreen designs emerge on the market. However, the touchscreen is fixedly arranged on the over-head headphone. The user needs to take down the over-head headphone before performing an operation, and therefore, the over-head headphone is inconvenient to use.

SUMMARY OF THE PRESENT DISCLOSURE

The present disclosure provides a headphone with a touchscreen, to resolve the problem that an existing over-head headphone with a touchscreen is inconvenient to operate.

The present disclosure relates to a headphone with a touchscreen, including a headband, a first headphone body, a second headphone body, and a touch control apparatus, where the first headphone body and the second headphone body are respectively arranged on two ends of the headband, and the touch control apparatus is detachably arranged on the first headphone body; and a first wireless communication element is arranged in the first headphone body, and a second wireless communication element is arranged in the touch control apparatus, and the first wireless communication element is communicatively connected to the second wireless communication element.

As further improvement of the present disclosure, a switch is arranged on a side of the touch control apparatus, facing the first headphone body, and the touchscreen is arranged on the touch control apparatus; and when the touch control apparatus is provided on the first headphone body, the switch is pressed down and is in an off state, making the touchscreen be off; or when the touch control apparatus is taken down, the switch pops up and is in an on state, making the touchscreen be on.

As further improvement of the present disclosure, a groove is provided on an outer side of the first headphone body, and the touch control apparatus fits the groove.

As further improvement of the present disclosure, the touch control apparatus further includes a housing with an opening on one side, the housing fits the groove in size, the touchscreen is arranged at the opening of the housing, and both the second wireless communication element and the switch are arranged in the housing.

As further improvement of the present disclosure, a first magnetic component is arranged in the housing, and a second magnetic component coupling with the first magnetic component is arranged in the first headphone body.

As further improvement of the present disclosure, the first magnetic component includes a first magnetic body and a second magnetic body, a first mounting member is arranged on another side of the housing, facing the opening, a second mounting member is arranged on a side wall of the housing adjacent to the opening, the first magnetic body is arranged on the first mounting member, and the second magnetic body is arranged on the second mounting member. The second magnetic component includes a third magnetic body and a fourth magnetic body, where the third magnetic body is arranged on a bottom of the groove and faces the first magnetic body, and the fourth magnetic body is arranged on a side wall of the groove and faces the second magnetic body.

As further improvement of the present disclosure, the touch control apparatus further includes a first circuit board, the first circuit board is electrically connected to the second wireless communication element and the touchscreen, a second circuit board is arranged on the first headphone body, a metal spring pin is arranged on the first headphone body, the metal spring pin is electrically connected to the second circuit board, a metal contact opposite to the metal spring pin is arranged on the touch control apparatus, and the metal contact is electrically connected to the first circuit board. When the touch control apparatus is arranged on the first headphone body, the metal spring pin abuts against the metal contact.

As further improvement of the present disclosure, a battery mounting member is further arranged in the housing. The touch control apparatus further includes a battery, the battery is arranged on the battery mounting member, and the battery is electrically connected to the first circuit board.

As further improvement of the present disclosure, a charging interface is further arranged on the touch control apparatus, and the charging interface is electrically connected to the first circuit board.

The present disclosure has the following beneficial effects.

According to the headphone with a touchscreen provided in the present disclosure, the touch control apparatus is detachably arranged on the first headphone body, such that the touch control apparatus can be taken down from the first headphone body. The first wireless communication element is arranged in the first headphone body, the second wireless communication element is arranged in the touch control apparatus, and the first wireless communication element is communicatively connected to the second wireless communication element, such that after the touch control apparatus is taken down, the headphone further can be controlled by the user through the touch control apparatus, and functions of the headphone can also be controlled without a button on the headphone. The touchscreen is arranged to greatly expand functions of the headphone, such that the headphone is not limited to functions such as switching to a previous song/next song, playing/pausing, calling, turning on/off an automatic noise canceller (ANC), and the like, thereby bringing better user experience.

DETAILED DESCRIPTION OF THE EMBODIMENTS

For a better understanding of the foregoing technical solution, the following describes the foregoing technical solution in detail with reference to the accompanying drawings and specific implementations.

Figure 1:
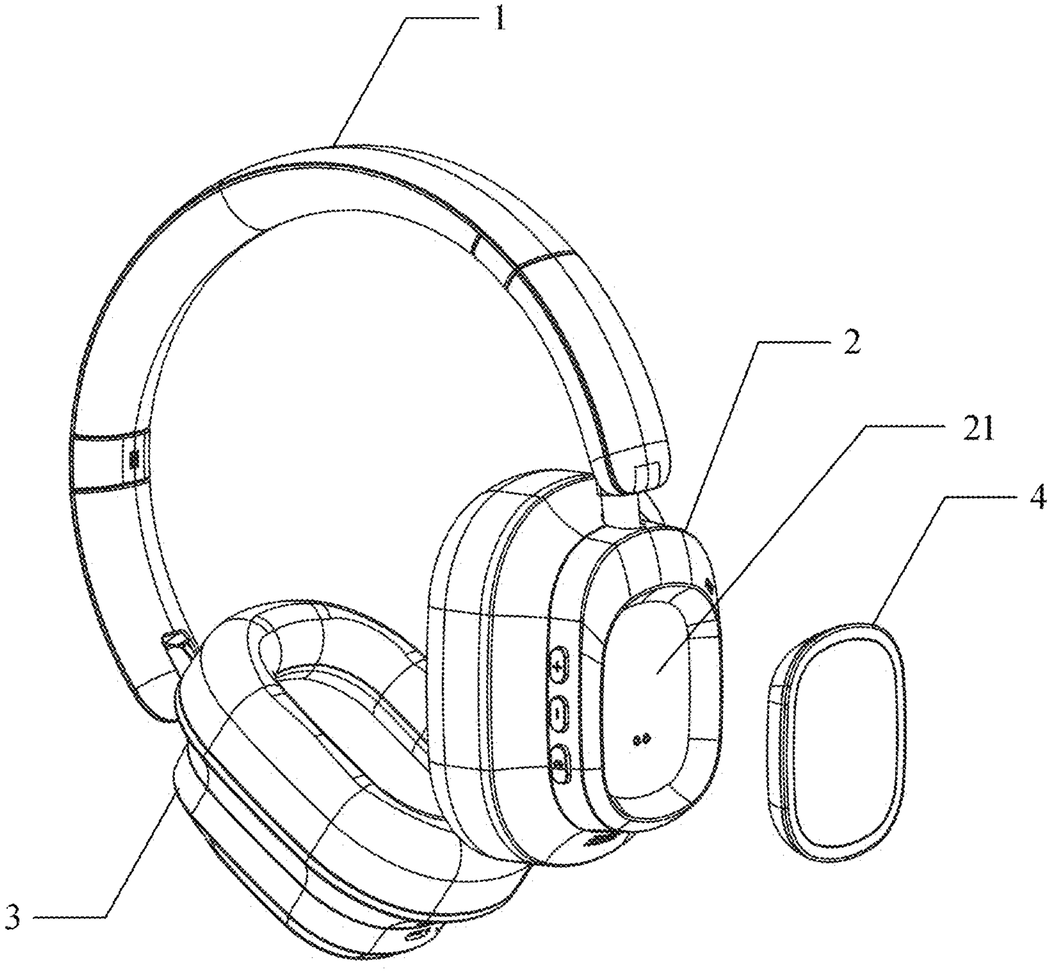
FIG. 1 is a schematic diagram showing a structure of a headphone with a touchscreen according to an embodiment of the present disclosure.
Figure 2:
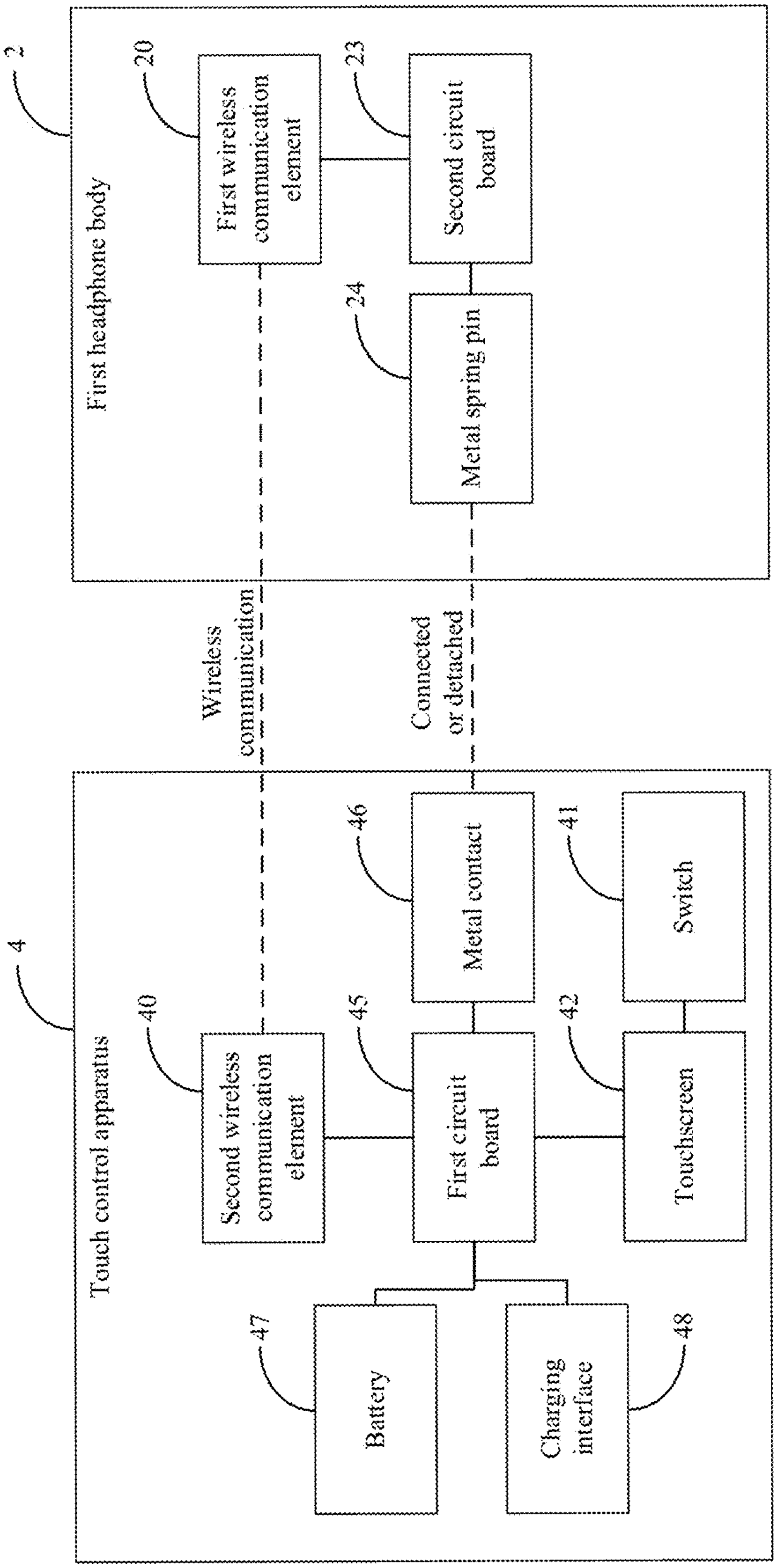
FIG. 2 is a schematic diagram showing electric connection between a touchscreen and a headphone.

FIG. 1 is a schematic diagram of a structure of a headphone with a touchscreen according to an embodiment of the present disclosure. As shown in FIG. 1, the headphone with a touchscreen includes a headband 1, a first headphone body 2, a second headphone body 3, and a touch control apparatus 4. The headband 1 is arc-shaped, and fits a head shape of a user. The first headphone body 2 and the second headphone body 3 are respectively arranged on two ends of the headband 1. A sound making part and an ear cushion are arranged in each of the first headphone body 2 and the second headphone body 3, and the ear cushion is arranged around the sound making part. It should be noted that, both the first headphone body 2 and the second headphone body 3 are rotatably connected to end parts of the headband 1 through connecting shafts. The touch control apparatus 4 is detachably arranged on the first headphone body 2. A first wireless communication element 20 (shown in FIG. 2) is arranged in the first headphone body 2, a second wireless communication element 40 (shown in FIG. 2) is arranged in the touch control apparatus 4, and the first wireless communication element 20 is communicatively connected to the second wireless communication element 40, such that an instruction emitted by the touch control apparatus 4 can be transmitted to the first wireless communication element 20 through the second wireless communication element 40, and to the headphone through the first wireless communication element 20.

According to the headphone with a touchscreen provided in the present disclosure, the touch control apparatus 4 is detachably arranged on the first headphone body 2, such that the touch control apparatus 4 can be taken down from the first headphone body 2. The first wireless communication element 20 is arranged in the first headphone body 2, the second wireless communication element 40 is arranged in the touch control apparatus 4, and the first wireless communication element 20 is communicatively connected to the second wireless communication element 40, such that after the touch control apparatus 4 is taken down, the headphone further can be controlled by the user through the touch control apparatus 4, and functions of the headphone can also be controlled without a button on the headphone. In addition, the touchscreen 42 is arranged to greatly expand functions of the headphone, such that the headphone is not limited to functions such as switching to a previous song/next song, playing/pausing, calling, turning on/off an ANC (automatic noise canceller), and the like, thereby bringing better user experience.

Figure 3:
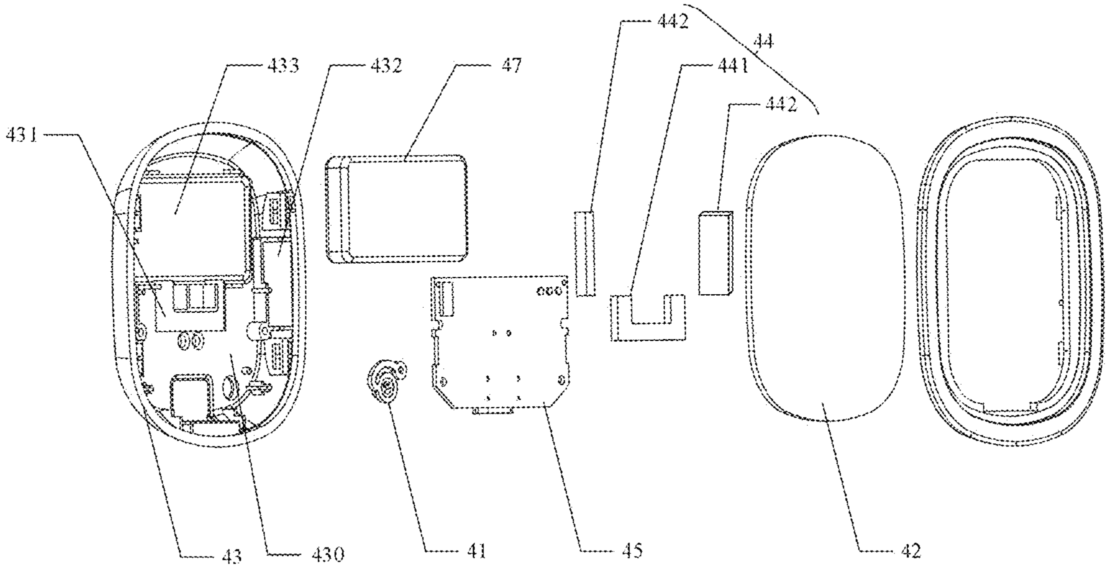
FIG. 3 is a schematic diagram showing a structure of a touch control apparatus of a headphone with a touchscreen according to an embodiment of the present disclosure.

Further, as shown in FIG. 3, a switch 41 is arranged on a side of the touch control apparatus 4, facing the first headphone body 2, and the touchscreen 42 is arranged on the touch control apparatus 4. When the touch control apparatus 4 is provided on the first headphone body 2, the switch 41 is pressed down and is in an off state, making the touchscreen 42 be off. When the touch control apparatus 4 is taken down, the switch 41 pops up and is in an on state, making the touchscreen 42 be on.

Specifically, the switch 41 is arranged, such that when the touch control apparatus 4 is taken down by the user, the switch 41 automatically pops up and is turned on, making the touchscreen 42 automatically be on without a manual operation of the user for making the touchscreen 42 be on. When the touch control apparatus 4 is provided on the first headphone body 2 by the user, the switch 41 is pressed down and is turned off, making the touchscreen 42 automatically be off to save power.

Further, a groove 21 is provided on an outer side of the first headphone body 2, and the touch control apparatus 4 fits the groove 21.

Specifically, the groove 21 that fits the touch control apparatus 4 is provided on the housing 43 of the first headphone body 2. In this case, when the touch control apparatus 4 is stably provided on the first headphone body 2, the touch control apparatus 4 is unlikely to fall off.

Further, the touch control apparatus 4 further includes a housing 43 with an opening 430 on one side. The housing 43 fits the groove 21 in size. The touchscreen 42 is arranged at the opening 430 of the housing 43. Both the second wireless communication element 40 and the switch 41 are arranged in the housing 43.

Further, a first magnetic component 44 is arranged in the housing 43, and a second magnetic component 22 opposite to the first magnetic component 44 is arranged in the first headphone body 2.

Specifically, the first magnetic component 44 is arranged in the housing 43, and the second magnetic component 22 is arranged in the first headphone body 2. Through magnetic attraction between the first magnetic component 44 and the second magnetic component 22, the touch control apparatus 4 is fixed in the groove 21.

Figure 4:
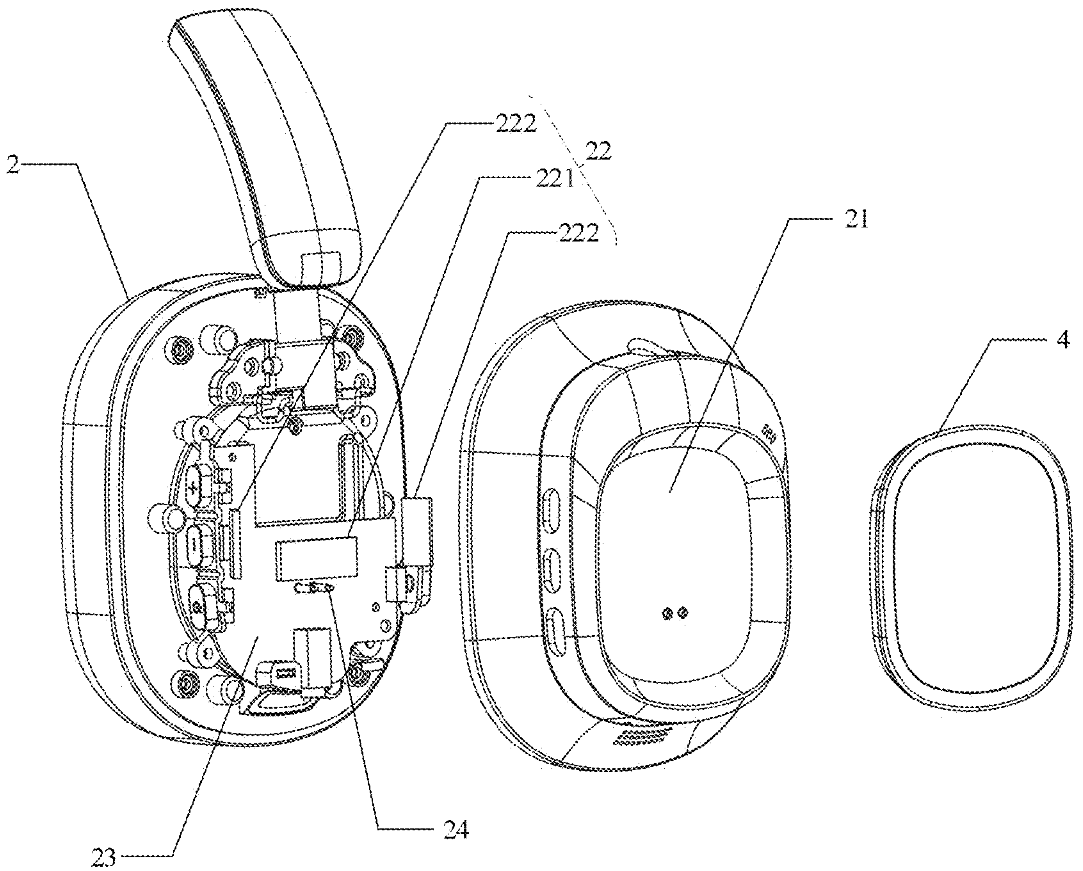
FIG. 4 is a schematic diagram showing a partial structure of a headphone with a touchscreen according to an embodiment of the present disclosure.

Further, as shown in FIG. 4, to improve a fixing effect of the touch control apparatus 4, the first magnetic component 44 includes a first magnetic body 441 and a second magnetic body 442. A first mounting member 431 is arranged on another side of the housing, 43 facing the opening 430. A second mounting member 432 is arranged on a side wall of the housing 43 adjacent to the opening 430. The first magnetic body 441 is mounted on the first mounting member 431, and the second magnetic body 442 is mounted on the second mounting member 432. The second magnetic component 22 includes a third magnetic body 221 and a fourth magnetic body 222. The third magnetic body 221 is arranged on a bottom of the groove 21 and faces the first magnetic body 441, and the fourth magnetic body 222 is arranged on a side wall of the groove 21 and faces the second magnetic body 442.

Specifically, the first magnetic body 441 and the third magnetic body 221 attract each other to achieve an effect of fixing the touch control apparatus 4. The second magnetic body 442 and the fourth magnetic body 222 attract each other, making the touch control apparatus 4 unlikely fall off from the groove 21.

Figure 5:
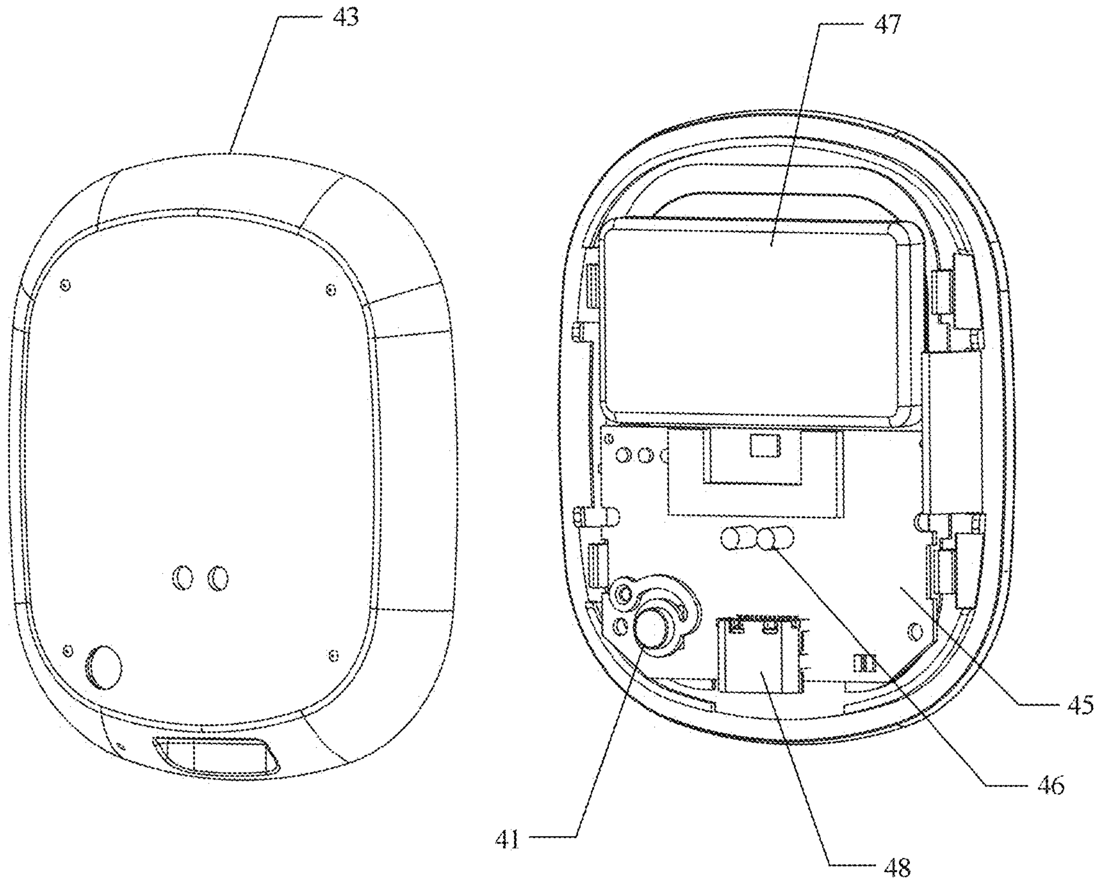
FIG. 5 is a schematic diagram showing another structure of a touch control apparatus of a headphone with a touchscreen according to an embodiment of the present disclosure.

Further, as shown in FIG. 5, the touch control apparatus 4 further includes a first circuit board 45. The first circuit board 45 is electrically connected to the second wireless communication element 40 and the touchscreen 42. A second circuit board 23 is arranged on the first headphone body 2. A metal spring pin 24 is arranged on the first headphone body 2. The metal spring pin 24 is electrically connected to the second circuit board 23. A metal contact 46 opposite to the metal spring pin 24 is arranged on the touch control apparatus 4, and the metal contact 46 is electrically connected to the first circuit board 45. When the touch control apparatus 4 is arranged on the first headphone body 2, the metal spring pin 24 abuts against the metal contact 46.

Specifically, the metal spring pin 24 is arranged on the first headphone body 2, and the metal contact 46 is arranged on the touch control apparatus 4. After the metal spring pin 24 abuts against the metal contact 46, the first headphone body 2 is conducted with the touch control apparatus 4. In this case, not only can signal communication between the first headphone body 2 and the touch control apparatus 4 be achieved, but also the touch control apparatus 4 can be charged.

Further, a battery mounting member 433 is further arranged in the housing 43. The touch control apparatus 4 further includes a battery 47, the battery 47 is arranged on the battery mounting member 433, and the battery 47 is electrically connected to the first circuit board 45.

Further, as shown in FIG. 5, a charging interface 48 is further arranged on the touch control apparatus 4, and the charging interface 48 is electrically connected to the first circuit board 45.

Specifically, the charging interface 48 is arranged on the touch control apparatus 4 to independently charge the battery 47 in the touch control apparatus 4.

Although some preferred embodiments of the present disclosure have been described, persons skilled in the art can make changes and modifications to these embodiments once they learn the basic inventive concept. Therefore, the appended claims are intended to be interpreted as including the preferred embodiments and all changes and modifications falling within the scope of the present disclosure. Apparently, persons skilled in the art can make various modifications and transformations to the present disclosure without departing from the spirit and scope of the present disclosure. The present disclosure is intended to cover these modifications and transformations provided that they fall within the scope defined by the following claims and their equivalent technologies.

What is claimed is:

1. A headphone with a touchscreen, comprising a headband, a first headphone body, a second headphone body, and a touch control apparatus, wherein the first headphone body and the second headphone body are respectively arranged on two ends of the headband, and the touch control apparatus is detachably arranged on the first headphone body; and a first wireless communication element is arranged in the first headphone body, a second wireless communication element is arranged in the touch control apparatus, and the first wireless communication element is communicatively connected to the second wireless communication element;

wherein a switch is arranged on a side of the touch control apparatus, facing the first headphone body, and the touchscreen is arranged on the touch control apparatus; and when the touch control apparatus is arranged on the first headphone body, the switch is pressed down and is in an off state, making the touchscreen be off; when the touch control apparatus is detached from the first headphone body, the switch pops up and is in an on state, making the touchscreen be on.

2. The headphone according to claim 1, wherein a groove is defined on an outer side of the first headphone body, and the touch control apparatus fits the groove.

3. The headphone according to claim 2, wherein the touch control apparatus further comprises a housing with an opening on one side, the housing is sized to fit the groove, the touchscreen is arranged at the opening of the housing, and both the second wireless communication element and the switch are arranged in the housing.

4. The headphone according to claim 3, wherein a first magnetic component is arranged in the housing, and a second magnetic component coupling with the first magnetic component is arranged in the first headphone body.

5. The headphone according to claim 4, wherein the first magnetic component comprises a first magnetic body and a second magnetic body, a first mounting member is arranged on another side of the housing, facing the opening, a second mounting member is arranged on a side wall of the housing adjacent to the opening, the first magnetic body is mounted on the first mounting member, and the second magnetic body is mounted on the second mounting member; and the second magnetic component comprises a third magnetic body and a fourth magnetic body, the third magnetic body is arranged on a bottom of the groove and faces the first magnetic body, and the fourth magnetic body is arranged on a side wall of the groove and faces the second magnetic body.

6. The headphone according to claim 3, wherein the touch control apparatus further comprises a first circuit board, the first circuit board is electrically connected to the second wireless communication element and the touchscreen, a second circuit board is arranged in the first headphone body, a metal spring pin is arranged on the first headphone body, the metal spring pin is electrically connected to the second circuit board, a metal contact opposite to the metal spring pin is arranged on the touch control apparatus, and the metal contact is electrically connected to the first circuit board; and when the touch control apparatus is disposed on the first headphone body, the metal spring pin abuts against the metal contact.

7. The headphone according to claim 6, wherein a battery mounting member is further arranged in the housing, the touch control apparatus further comprises a battery, the battery is mounted on the battery mounting member, and the battery is electrically connected to the first circuit board.

8. The headphone according to claim 7, wherein a charging interface is further arranged on the touch control apparatus, and the charging interface is electrically connected to the first circuit board.

* * * * *